Nov. 17, 1942.  C. W. RIETZEL  2,302,256
VALVE CONSTRUCTION
Filed Aug. 3, 1940  2 Sheets-Sheet 1
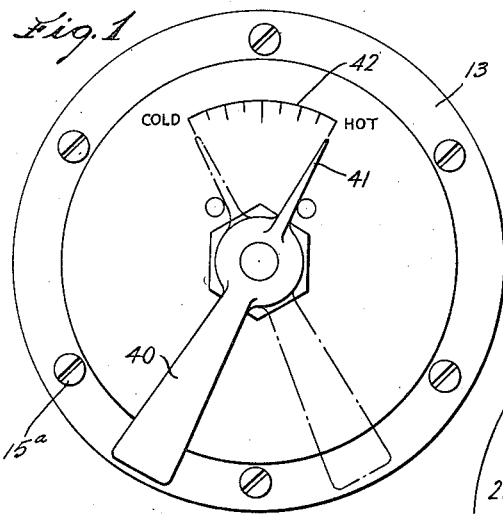
Fig. 1
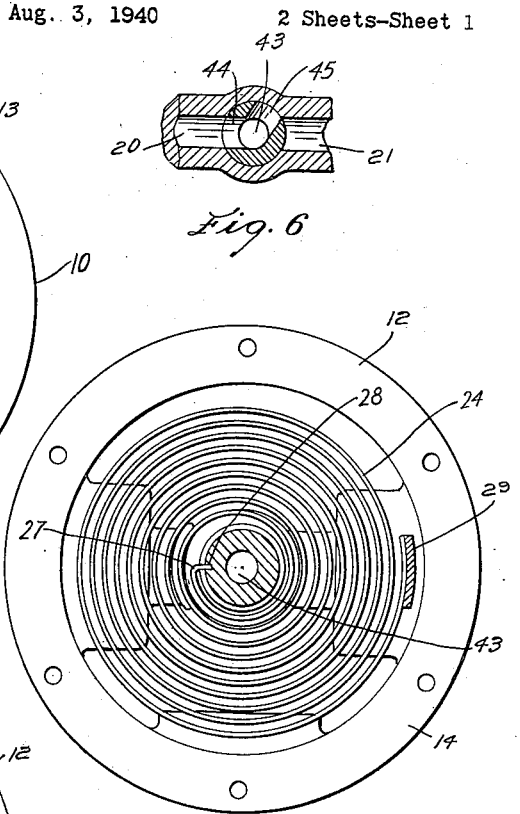
Fig. 6
Fig. 2
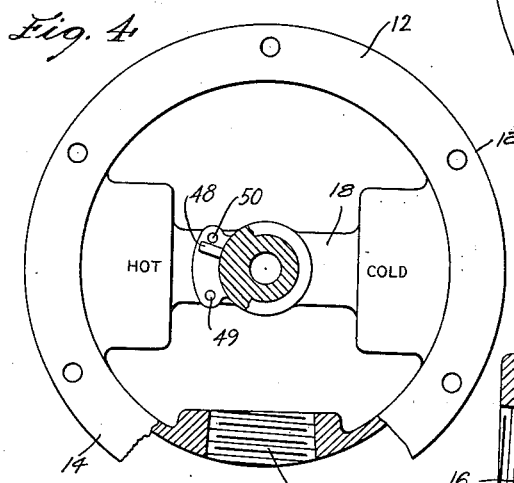
Fig. 4
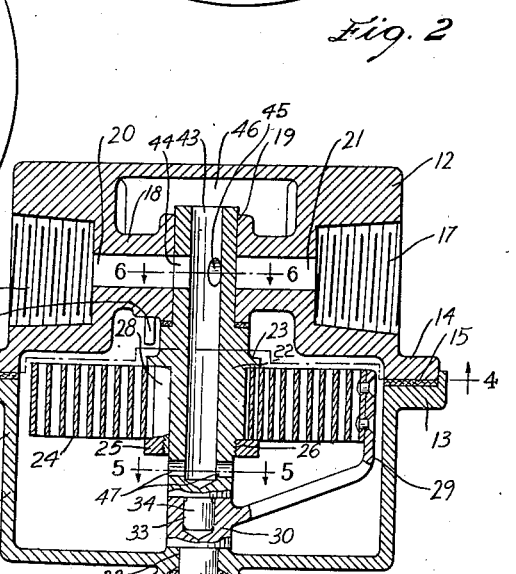
Fig. 3
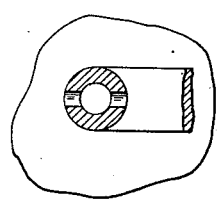
Fig. 5
INVENTOR
Charles W. Rietzel
BY
Nathaniel Frucht
ATTORNEY Nov. 17, 1942.  C. W. RIETZEL  2,302,256
VALVE CONSTRUCTION
Filed Aug. 3, 1940  2 Sheets-Sheet 2

INVENTOR
Charles W. Rietzel
BY Nathaniel Frucht
ATTORNEY

Patented Nov. 17, 1942

2,302,256

UNITED STATES PATENT OFFICE 2,302,256

VALVE CONSTRUCTION

Charles W. Rietzel, Providence, R. I., assignor to Leonard Valve Company, Providence, R. I., a corporation of Rhode Island Application August 3, 1940, Serial No. 350,205

6 Claims. (Cl. 236—12)

My present invention relates to fluid mixers and has particular reference to a novel construction and arrangement of a thermostatic mixing valve.

It is the principal object of my invention to provide a simple thermostatic valve construction, which can be manufactured at low cost, and which can be readily assembled.

Another object of my invention is to provide a rotary type valve construction minimizing the effects of fluid pressure.

An additional object of my invention is to provide an arrangement which ensures an adequate mixing of hot and cold fluids before the mixed fluid contacts the thermostatic element.

Still another object of my invention is to provide a valve housing construction in which the valve parts may be readily assembled, thus ensuring proper cooperation and alignment of the parts.

With the above and other objects and advantageous features in view, my invention consists of a novel arrangement of parts more fully disclosed in the detailed description following, in conjunction with the accompanying drawings, and more specifically defined in the claims appended thereto.

In the drawings:

Fig. 1 is a plan view of the novel valve arrangement;

Fig. 2 is a plan view similar to Fig. 1, with the cover removed, parts being in section;

Fig. 3 is a horizontal section through the valve arrangement;

Fig. 4 is a section on line 4—4 of Fig. 3;

Fig. 5 is a section on the line 5—5 of Fig. 3;

Fig. 6 is a section on the line 6—6 of Fig. 3;

Figure 7:
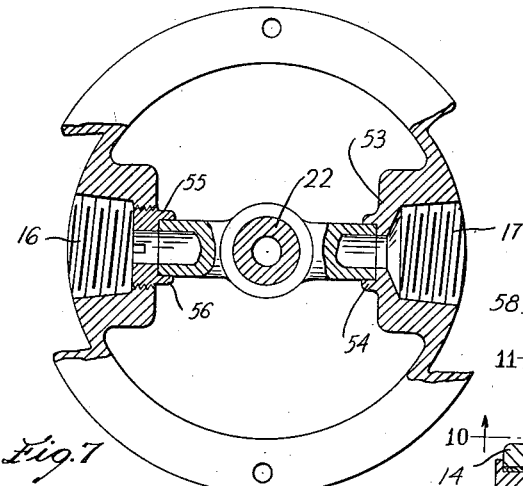
Fig. 7 is a section similar to Fig. 4, of a modified valve base arrangement.
Figure 8:
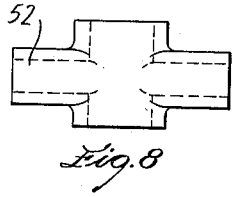
Fig. 8 is a plan view of the tubular valve seat of Fig. 7.

Referring to the drawings, the novel thermostatic valve 10 includes a top portion 11, and a base portion 12, the parts being flanged as indicated at 13 and 14, so as to be secured together with an intermediate packing 15, by means of studs or the like 15a, see Fig. 1. The base 12, see Fig. 3, has a threaded inlet 16 for hot fluid, and a threaded inlet 17 for cold fluid, the inlets being formed in bosses and being joined by a bridge 18 which has a central bore 19 functioning as a valve seat, the bridge portion having passageways 20 and 21 for communicating the inlets with the central bore. A tubular valve arrangement 22, see Fig. 3, has an enlarged annular portion 23 serving as a support for a spiral thermostatic coil 24, and a lock ring 25 engaging a threaded recess 26 on the valve 22 to lock the thermostatic coil in place. The inner end of the thermostatic coil is bent as indicated at 27, see Fig. 2, for insertion in a recess or vertical slot 28 in the valve body 22, the outer end of the coil 24 being secured to a strap or the like 29, secured to or formed integral with a cap portion 30 which has a regulating stem 31 extending outwardly through a bore 32 in the top portion 11, the cap 30 having a recess 33 and the valve body having a bearing 34 adapted to be rotatably journalled in said recess 33. The upper end of the control stem 31 is suitably packed, preferably by using a cylindrical hub 35 integral with the top portion 11 which receives a packing 36, a plug 37 pressing against the packing and being retained in position by a cap 38 which threadedly engages the correspondingly threaded outer surface of the hub 35. The end of the control stem 31 is squared as indicated at 39 to receive a manually adjustable handle 40, see Fig. 1, which has an indicator 41 cooperating with the indicia 42 on the top portion 11. The valve body 22 has a central bore 43, see Fig. 3, and is provided with angularly positioned flow openings 44 and 45 for permitting inflow of fluid from the inlets 16 and 17, the mixed fluid exiting from the lower end of the valve body into a chamber 46 around the bridge for mixing prior to flowing into contact with the thermostatic coil 24. Auxiliary outflow ports 47 are provided opening into the top portion about the thermostatic strip 24, whereby the fluid which is mixed in the bore 43 emerges on both sides of the thermostatic coil, the fluid passing through the chamber 46 being more thoroughly mixed than the fluid emerging from the ports 47. The valve body has movement limiting means, these limiting means preferably being a pin 48 engageable with two spaced pins 49 and 50 on the bridge, whereby movement of the valve body is limited to oscillation between the pins 49 and 50 by the pins 48. The operation of the improved thermostatic valve may now be explained. The hot and cold fluids entering through the inlets 16 and 17, to which suitable inlet pipes or conduits are connected, pass through the openings 44 and 45 into the bore 43 of the valve body, and are mixed, and emerge through the base of the valve body into the chamber 46, where the mixed fluid passes upwardly into contact with the thermostatic strip, an auxiliary flow taking place through the ports 47 and into the upper chamber on the top of the thermostatic coil 24. The mixed fluid then passes outwardly through any suitable outlet, such as for example indicated at 50a in Fig. 4. Instead of using an integral bridge construction such as indicated in Fig. 3, a separate bridge element 52, see Fig. 8, may be used, the base in the region of the inlet 17 being shaped as indicated at 53 to provide a flange portion 54 adapted to receive one end of the bridge 52, a threaded nut element 55 being threaded into the inlet 16, at the inner end thereof, and having a flange portion 56 to receive the other end of the bridge 52, whereby the bridge 52, which is hollow as shown, may be adjusted in position to be in axial alignment with the valve body 22 to act as a valve seat therefor, the inlet passageways to the valve body being in alignment with the hollow arms of the bridge 52.

Figure 9:
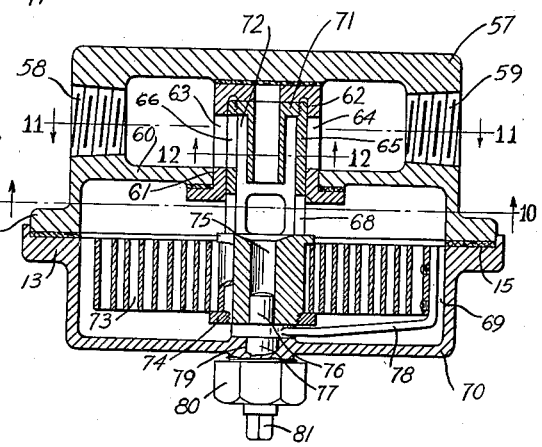
Fig. 9 is a horizontal section, similar to Fig. 3, of a modified construction.
Figure 10:
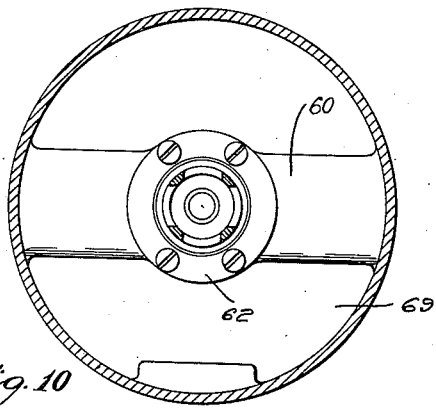
Fig. 10 is a section on the line 10—10 of Fig. 9.
Figure 11:
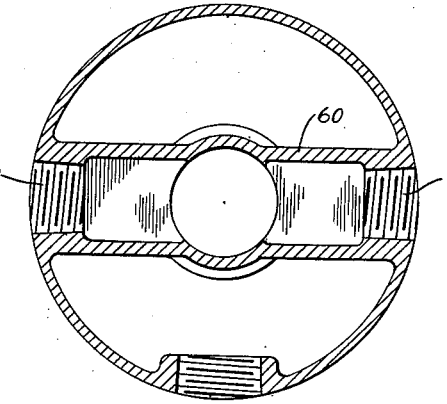
Fig. 11 is a section of the valve base on the line 11—11 of Fig. 9.
Figures 12, 13:
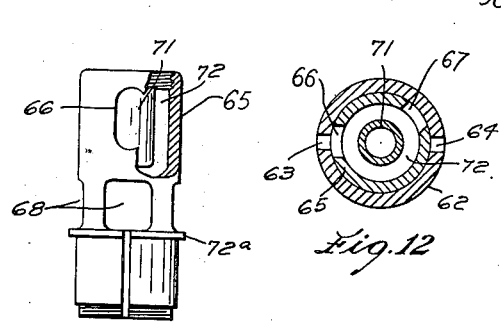
Fig. 12 is a section on the line 12—12 of Fig. 9.
Fig. 13 is an elevation, partly broken away, of the control valve for the modification shown in Fig. 9.

If it be desired to make the valve more compact, a construction such as shown in Figs. 9 to 13 inclusive may be used, the base 57 having aligned inlet flow passages 58 and 59, and being provided with a bridge portion 60 in the form of a flat plate extending across the base and having a central bore 61 for receiving a valve seat bushing 62, provided with flow passageways 63 and 64 in alignment with the inflow openings 58 and 59. Seated in the bushing 62 is a tubular valve 65, see Fig. 13, which has two angularly disposed flow passageways 66 and 67, see Fig. 12, for controlling flow of fluid from the inlets and through the passageways 63 and 64 into the valve body, the fluid then emerging through a series of spaced ports 68 into a thermostatic chamber 69 provided between the base 57 and a top portion 70 adapted to be secured thereto. An inner baffle element 71, see Fig. 13, is centrally positioned within the valve body 65, as by threading to the lower portion thereof, to provide an annular flow channel 72 which acts as a mixing chamber for the two fluids, which mix within the valve body and then emerge through the ports 68. The upper portion of the valve body has an annular flange 72a which serves as a support for a spiral thermostatic coil 73, the inner end of the coil being bent and the valve body being slit, as previously described, for connecting the thermostatic coil thereto, an annular ring 74 being threaded on the valve body to lock the thermostatic strip in place. The upper portion of the valve body has a central bore 75, which accommodates a stud portion 76 of a regulating element 77, the regulating element having an integral arm 78 which is secured to the outer end of the thermostatic coil as indicated in Fig. 9, and which projects outwardly through a bore 79 in the upper portion, and through the usual packing arrangement 80, and is provided with a square end 81 for adjustment, the square end 81, if desired, having an adjusting lever such as indicated in Fig. 1, mounted thereon. The above-described construction thus utilizes a more compact arrangement of the parts, and utilizes a hollow rotatable valve arrangement which ensures a mixing of the hot and cold fluids therein before the fluids emerge into the thermostatic chamber to contact the thermostatic coil. The use of annular bushing 62 ensures a proper alignment of the port openings, at relatively small cost, and reduces the cost of manufacture and of assembly.

While I have described certain specific constructional embodiments of my invention, it is obvious that changes in the shape and size and relative arrangement of the parts may be made to suit the requirements for different valve designs, without departing from the spirit and the scope of the invention as defined in the appended claims.

I claim:

1. In a mixing valve, a housing having an inlet passageway for hot fluid, an inlet passageway for cold fluid, and an outlet for mixed fluid, means mounted in said housing for controlling the inflow of fluid from said hot and cold inlet passageways, a mixing chamber in said housing, said mixing chamber communicating with said control means and said outlet, a thermostatic chamber in said housing communicating with said mixing chamber, a thermostatic element in said thermostatic chamber for operating said control means in response to the mixed fluid temperature, and means for by-passing a stream of mixed fluid from said inlets direct to said thermostatic chamber.

2. In a mixing valve, a housing having an inlet passageway for hot fluid, an inlet passageway for cold fluid, and an outlet for mixed fluid, a rotatable valve mounted in said housing for controlling the inflow of fluid from said hot and cold inlet passageways, a mixing chamber in said housing, said mixing chamber communicating with said valve and said outlet, a thermostatic chamber in said housing communicating with said mixing chamber, a thermostatic element in said thermostatic chamber for operating said valve in response to the mixed fluid temperature, and means for by-passing a stream of mixed fluid from said inlets direct to said thermostatic chamber.

3. In a mixing valve, a housing having an inlet passageway for hot fluid, an inlet passageway for cold fluid, and an outlet for mixed fluid, a rotatable valve mounted in said housing for controlling the inflow of fluid from said hot and cold inlet passageways, a mixing chamber in said housing, said mixing chamber communicating with said valve and said outlet, a thermostatic chamber in said housing communicating with said mixing chamber, a thermostatic element in said thermostatic chamber for operating said valve in response to the mixed fluid temperature, and a hollow integral extension of said valve extending into said thermostatic chamber for by-passing a stream of mixed fluid from said inlets direct to said thermostatic chamber.

4. In a mixing valve, a housing having an inlet for cold fluid, an inlet for hot fluid, and an outlet for mixed fluid, a mixing chamber in said housing communicating with said outlet, a hollow bridge portion connecting said inlets, a hollow valve mounted in said housing and extending into said bridge portion, said valve having spaced ports for controlling the flow of fluid from said inlets into said valve and communicating with said mixing chamber, a thermostatic chamber in said housing, and a thermostatic element mounted in said thermostatic chamber and adapted to rotatably operate said valve in response to the mixed fluid temperature, said thermostatic chamber communicating with the hollow of said valve and with said mixing chamber.

5. In a mixing valve, a housing having an inlet for cold fluid at one side thereof, an inlet for hot fluid oppositely positioned with respect to said cold water inlet, a hollow bridge portion extending across said housing between said inlets and having flow passageways for fluid from said inlets and including a valve seat portion, a valve body rotatably mounted in said valve seat portion having a central bore and openings for admitting fluid from said flow passageways to said central bore to mix therein said valve being rotatable to increase flow through one flow passageway and simultaneously decrease fluid flow through the other flow passageway, and said bore freely communicating with the housing interior around said hollow bridge portion, said housing having an outlet for mixed fluid, a thermostat chamber in said housing and a thermostatic device in said chamber operatively connected to said valve for rotating the valve in response to temperature changes in the fluid.

6. In a mixing valve, a housing having an inlet for cold fluid at one side thereof, an inlet for hot fluid oppositely positioned with respect to said cold water inlet, a hollow bridge portion extending across said housing between said inlets and having flow passageways for fluid from said inlets and including a valve seat portion, a valve body rotatably mounted in said valve seat portion having a central bore and openings for admitting fluid from said flow passageways to said central bore to mix therein, said valve being rotatable to increase flow through one flow passageway and simultaneously decrease fluid flow through the other flow passageway, and said bore freely communicating with the housing interior around said hollow bridge portion, said housing having an outlet for mixed fluid, a thermostat chamber in said housing and a thermostatic device in said chamber operatively connected to said valve for rotating the valve in response to temperature changes in the fluid, said bore also communicating directly with said thermostatic chamber.

CHARLES W. RIETZEL.